United States Patent [19]
Mong

[11] Patent Number: 5,381,866
[45] Date of Patent: Jan. 17, 1995

[54] MULTI-SHARE PLOUGH

[75] Inventor: Oyvind Mong, Kleppe, Norway

[73] Assignee: Kverneland Klepp AS, Kvernaland, Norway

[21] Appl. No.: 16,828

[22] Filed: Feb. 12, 1993

[30] Foreign Application Priority Data

Feb. 15, 1992 [GB] United Kingdom ............... 9203279

[51] Int. Cl.⁶ .................... A01B 3/46; A01B 15/14
[52] U.S. Cl. ........................... 172/219; 172/225
[58] Field of Search ............ 172/219, 225, 452, 457, 172/459, 460

[56] References Cited

U.S. PATENT DOCUMENTS

| | | | |
|---|---|---|---|
| 3,771,607 | 11/1973 | Mellen | 172/225 X |
| 3,830,312 | 8/1974 | Brandly | 172/225 |
| 4,067,396 | 1/1978 | Watts | 172/225 |
| 4,341,148 | 7/1982 | Kosakzecki | 172/225 X |
| 4,646,849 | 3/1987 | Watvedt | 172/225 |
| 4,778,013 | 10/1988 | Van Der Lely | 172/225 |
| 4,825,955 | 5/1989 | Watvedt | 172/225 X |
| 4,896,731 | 1/1990 | Besson | 172/225 |

FOREIGN PATENT DOCUMENTS

| | | |
|---|---|---|
| 0297969 | 1/1989 | European Pat. Off. . |
| 1594478 | 7/1970 | France . |
| 2201022 | 4/1974 | France . |
| 2248186 | 4/1974 | Germany . |
| 3325603C2 | 1/1985 | Germany . |
| 9202298 | 6/1992 | Germany . |
| 9205779 | 8/1992 | Germany . |

*Primary Examiner*—Randolph A. Reese
*Assistant Examiner*—Christopher J. Novosad
*Attorney, Agent, or Firm*—Foley & Lardner

[57] ABSTRACT

There is disclosed a semi-mountable plough comprising an elongate plough frame having a long forward frame section (1) carrying a plurality of plough bodies (2), a short intermediate section (3) pivotally connected to the rear end of the forward section (1), and a rear frame section (5) pivotally connected at its forward end to the rear of the intermediate section (3), with the plough being of a reversible type and the section (1, 3 and 5) being pivotable relative to each other in a generally horizontal plane to take-up new positions suitable for movement of the plough in a reverse direction. The rear frame section (5) is pivotable about a horizontal pivot (11) so as to follow any unevenness in the ground, and an actuator (12) is coupled with the rear frame section (5) and is operable in a first mode to allow limited pivotal movement of the rear frame section (5) about horizontal pivot (11), and in a second mode to prevent such pivotal movement.

13 Claims, 5 Drawing Sheets

MULTI-SHARE PLOUGH

BACKGROUND OF THE INVENTION

This invention relates to a multi-share plough and particularly, though not exclusively, to a semi-mountable plough of the reversible type, comprising an elongate plough frame carrying a plurality of plough bodies and being supported on wheel means, said elongate plough frame comprising a front plough frame section and a rear plough frame section, with the rear plough frame section being articulated directly to said front plough frame section or indirectly via an intermediate frame section.

In semi-mounted ploughs, the plough frame carries a large number of plough bodies, and therefore the plough frame has to be divided in order to constitute two mutually articulated frame sections, namely a front plough frame section and a rear plough frame section, and optionally with an intermediate frame section between the front and rear plough frame sections.

The purpose of such an articulated plough frame is to allow the plough to follow in a sufficient degree unevennesses and roughness of the ground.

Moreover, long semi-mounted ploughs have a support frame of such a longitudinal extent that the rear end portion possesses a tendency of being deflected resiliently.

When the ploughs become very long, the rearmost plough bodies will hang somewhat lower than the intermediate plough bodies. Therefore, this makes it difficult to control the rear portion.

This results in that the rearmost plough bodies - when the plough is placed into the soil at the beginning of each furrow - start to plough simultaneously with the foremost plough bodies. This results in the beginning of each furrow, as seen in a top plan view, after ploughing, showing a triangular area that has become ploughed and a triangular area that has not become ploughed.

With a twelve-share plough, a considerable area will receive such an uneven ploughing.

Normally, this area is ploughed laterally of the furrows in a final ploughing operation. When doing so, the soil becomes partly reversed back again within said triangular areas which already have been ploughed such that the soil which should have been the lowermost, comes uppermost again.

The result of all this is poor and uneven growth within said areas.

Attempts have been made to control the rear plough frame section through locking the link or pivot constituting the articulation between the front and rear plough frame sections or between the latter and an intermediate frame section, respectively, during the lifting and reversal of a semi-mounted reversible plough. Said link or pivot is released whenever the plough once more has taken the ploughing position.

However, such an arrangement does not represent a satisfactory solution.

SUMMARY OF THE INVENTION

The object of the present invention is to obviate the problems and difficulties associated with existing designs of multi-share ploughs of the kind concerned and, thus, provide a simple and efficient multi-share plough, preferably a semi-mounted reversible plough constructed and adapted in order to eliminate or substantially reduce the deficiencies and disadvantages of prior art multi-share ploughs having equivalent dimensions, thus giving rise to a much improved ploughing result.

According to the invention there is provided a multi-share plough comprising an elongate plough frame having a forward frame section adapted to be connected at its leading and to the rear of a towing vehicle a rear frame section pivotally connected at its forward end to the rear of the forward section so as to be capable of pivoting upwardly and downwardly relative to the forward section in order to follow unevennesses in the surface of the ground being ploughed, and a plurality of plough bodies mounted on said frame sections, in which an actuator is coupled with said rear frame section and is operable in a first mode to allow limited pivotal movement of the rear frame section and in a second mode to prevent such pivotal movement.

BRIEF DESCRIPTION OF THE DRAWINGS

An embodiment of multi-share plough according to the invention will now be described, by way of example only, with reference to the accompanying drawings, in which.

DETAILED DESCRIPTION OF THE PREFERRED EMBODIMENTS

Figure 2:
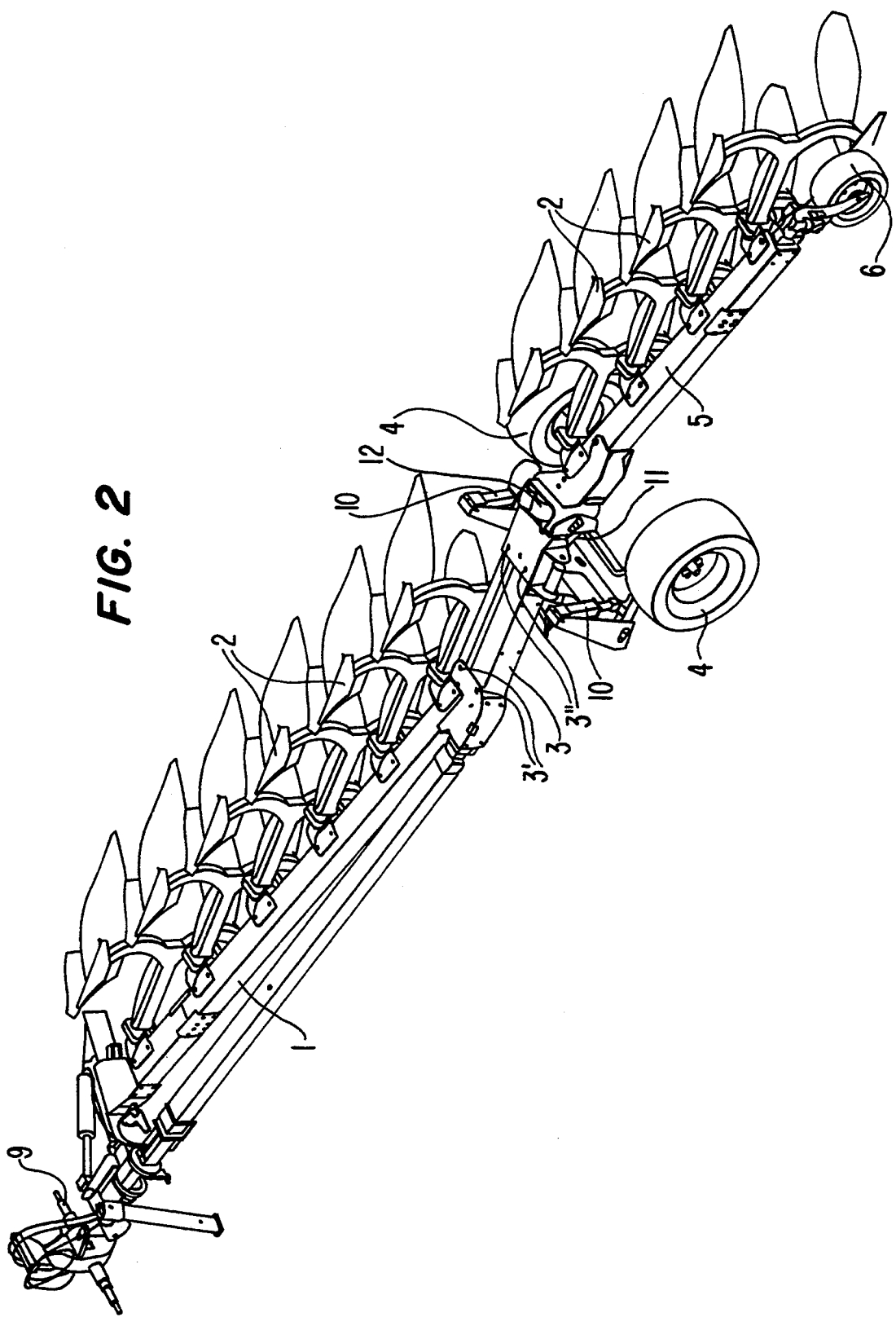
FIG. 2 is a perspective view of an embodiment of a semi-mounted reversible plough constructed and adapted according to the present invention, with the tractor omitted.
Figure 3:
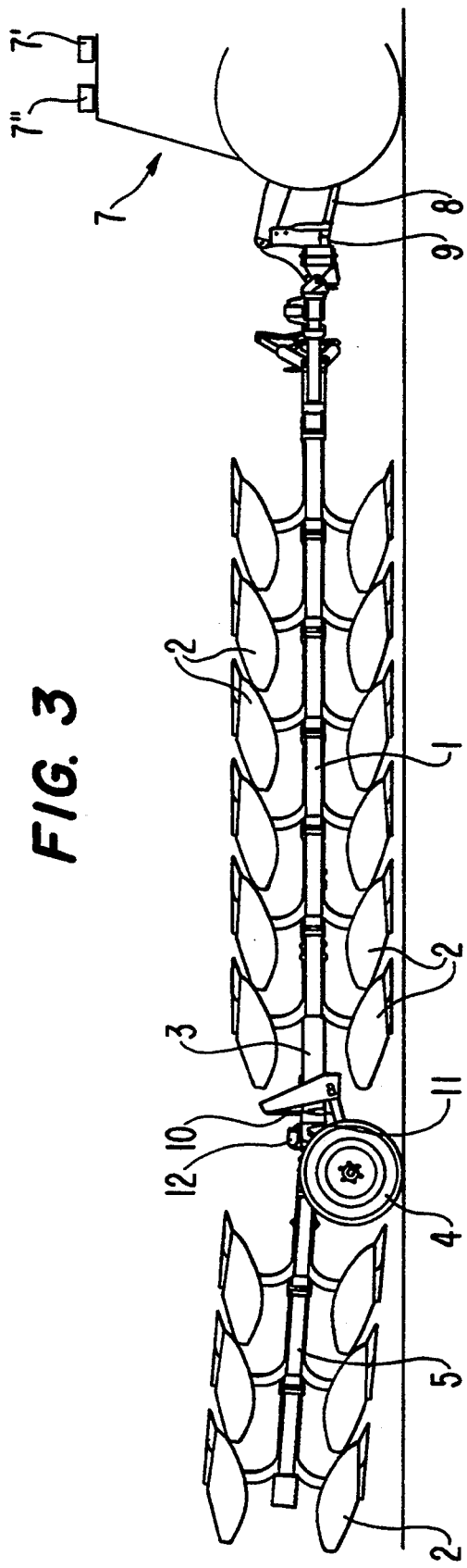
FIG. 3 is a side elevational view of the plough according to FIG. 2, with the rearmost depth wheel not being shown (however, a tractor has been shown partially)
Figure 4:
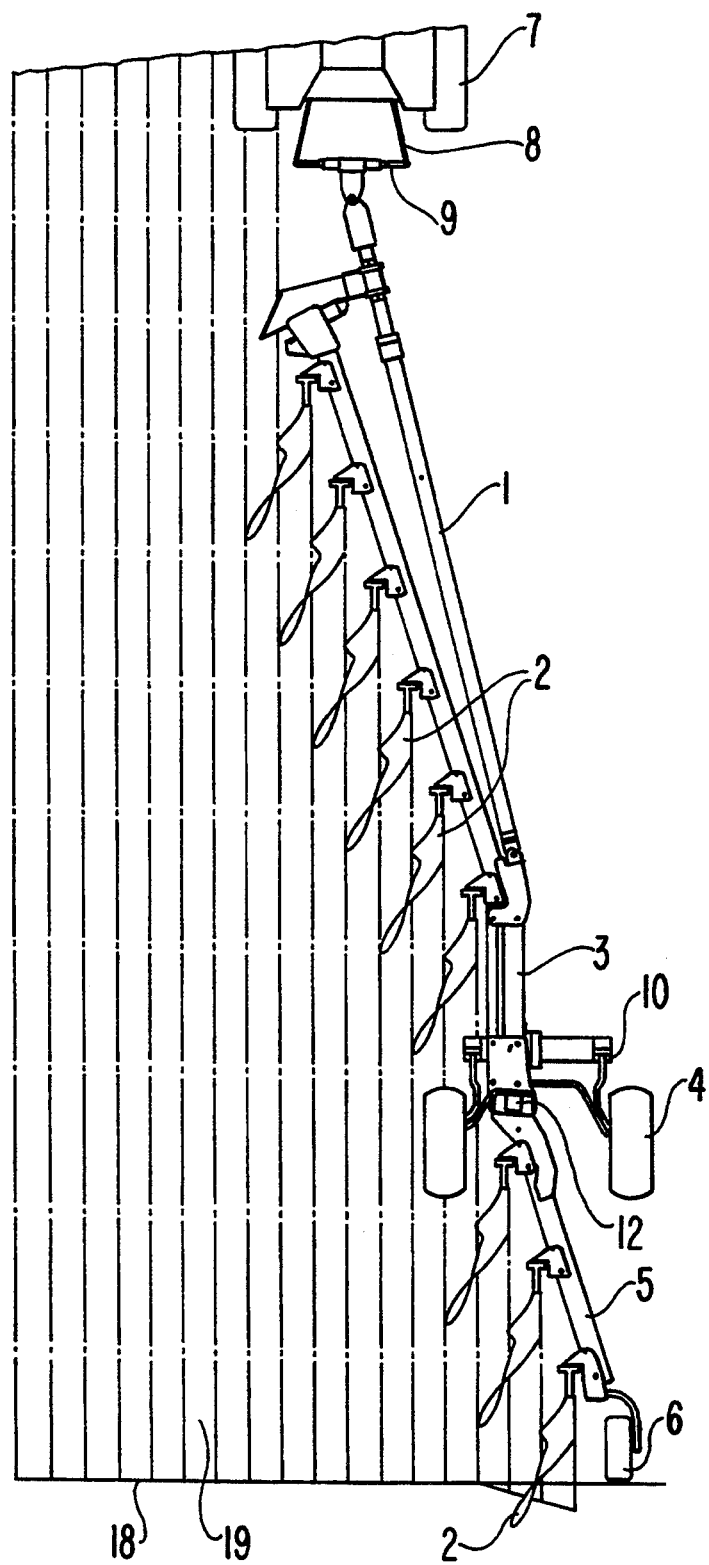
FIG. 4 is a top plan view of the plough according to FIGS. 2 and 3, the ploughing result being indicated diagrammatically.

First, reference is made to FIGS. 2 through 4 of the drawings, with reference numeral 1 denoting a front plough frame section of a multi-share semi-mounted reversible plough comprising an elongated articulated plough frame of considerable longitudinal extent carrying a plurality of plough bodies 2.

Likewise, the elongate plough frame comprises an intermediate frame section 3 provided with wheels 4, as well as a rear plough frame section 5 rearmost carrying a so-called depth wheel 5 (not shown in FIG. 3).

At the foremost end thereof, the front plough frame section 1 is coupled to the rear of tractor 7 (FIG. 3) via pull bars 8 and drag shaft 9. A first control valve 7' is disposed on the tractor for raising and lowering this coupler via a piston cylinder unit.

The wheels 4 of the intermediate section 3 may be raised and lowered by means of a pair of pressure fluid operated (hydraulic) cylinders 10. This set of wheels 4 are controlled by a manoeuvring valve 7″ within the tractor 7.

As previously mentioned, the elongate plough frame is of an articulated construction, the articulation being effected by means of a horizontal pivot 11 supported by the intermediate frame section 3 and about which the rear plough frame section 5 may tilt up and down. The intermediate section 3 is pivotally connected at its forward end to the rear of the forward frame section and at its rear end to the front of the frame section. Each pivotal connection is an upright pivot 3′, 3″ which allows relative generally horizontal lateral pivotal movement to take place for each reversal of the plough body. Thus, whenever the plough takes a ploughing position, the rear plough frame section 5 may be raised and lowered.

Figure 5:
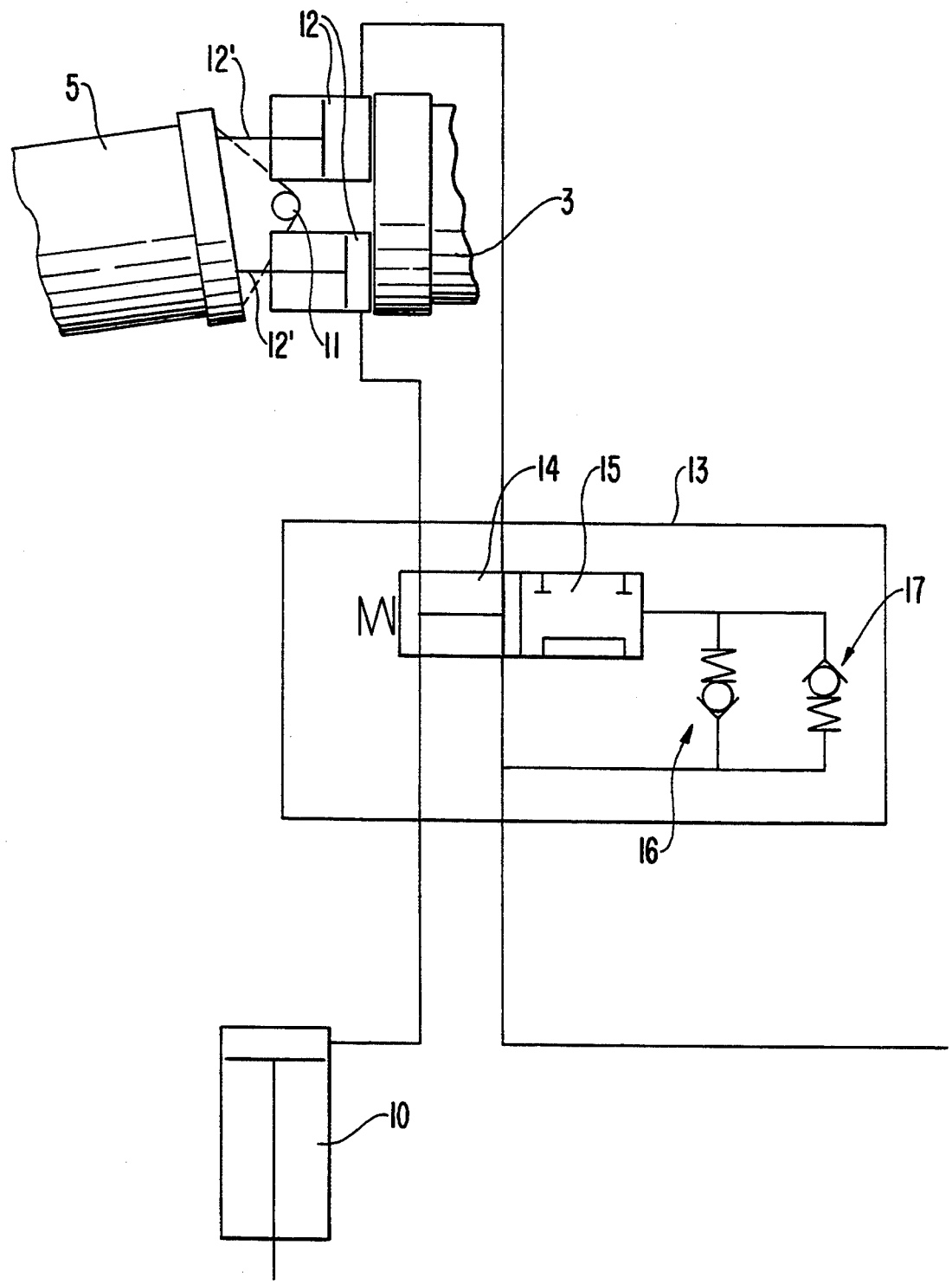
FIG. 5 shows a hydraulic circuit diagram of an assigned pressure fluid operated actuators (cylinders) for controlling the rear plough frame section at its articulated connection to the forward frame section (directly to the front plough frame section or indirectly via an intermediate frame section).

The tilting of the rear plough frame section 5 is effected by means of two pressure fluid operated actuator means (such as hydraulic cylinders) 12, said actuator means 12 being controlled by means of a valve 13, FIG. 5.

As it appears from FIG. 5, the cylinder ends of the pressure fluid operated actuator means 12 have been attached to the intermediate frame section 3, the two actuator means 12 being positioned at either side of the tilting pivot 11 for the rear plough frame section 5, the piston rods 12′ thereof being pivotally connected to the rear plough frame section 5.

The valve 13 consists of a spring-loaded pressure-controlled manoeuvring valve which can be connected in either one of two positions, indicated at 14 and 15, as well as two spring-loaded check valves 16 and 17, and which correspond with operation of the actuator 12 in a first mode which allows limited up or down pivotal movement of frame section 5 about pivot 11, and a second mode in which such pivotal movement is prevented. In this manner, actuators 12 and piston rods 12′ act as locking units.

When the plough takes the ploughing positions, and valve 13 takes the position illustrated in FIG. 5. Then, position 14 is active, interconnection between both cylinders 12 being established, so that the rear plough frame section 5 may move relatively freely and thus, follow unevennesses of the ground.

The further operation of this valve 13 will be described later on.

When the plough comes to the end of the furrow, the drag shaft 9 is lifted, so that the plough front will become free of the soil. Thereafter, the intermediate section 3 is lifted by means of the actuators 10 via the wheels 4. Because of the pivot 11, the rear plough frame section 5 still occupies a correct ploughing depth by means of the depth wheel 6. However, when the intermediate frame section 3 has been lifted up sufficiently, the rear section will also be brought to a level above ground level.

All this happens within a smooth movement, adapted to the speed of ploughing, so that all plough bodies leave the ground when arriving at an imaginary line 18 indicating the end of the furrows 19, see FIG. 4.

As soon as the plough has been brought entirely above ground level and the wheels have taken their highest position, either by being brought to rest against mechanical stops or in that the cylinders 10 have reached their end positions, the hydraulic pressure within the circuitry becomes equal to the manoeuvring pressure of the tractor 7.

Upon the occurrence of such a situation, the check valve 16 of the valve 13 lets oil through, connecting the manoeuvring valve such that position 15 becomes active. When the plough is in the course of being lifted-up, the rear plough frame section 5 will sag as previously mentioned, and when valve position 15 becomes effective, the rear plough frame section 5 will become locked in this position because the oil supply to the actuators/cylinders 12 has become closed.

Therefore, after the semi-mounted reversible plough has been reversed 180°, the rear plough frame section 5 will occupy an elevated (swung-up) position, such as shown in FIG. 3.

When the plough, after reversal, is to be put into the soil again the movements take place in the opposite order. First, the pull bars 8 of the tractor 7 are lowered and then the intermediate frame section 3. When the intermediate frame section 3 has been lowered to such an extent that the pressure within the cylinders 10 has fallen below a predetermined value, the check valve 17 will open, so that the manoeuvring valve connects back so that position 14 becomes active again. Then, the rear plough frame section 5 will be lowered such that it, once more, takes a correct ploughing position.

Figure 1:
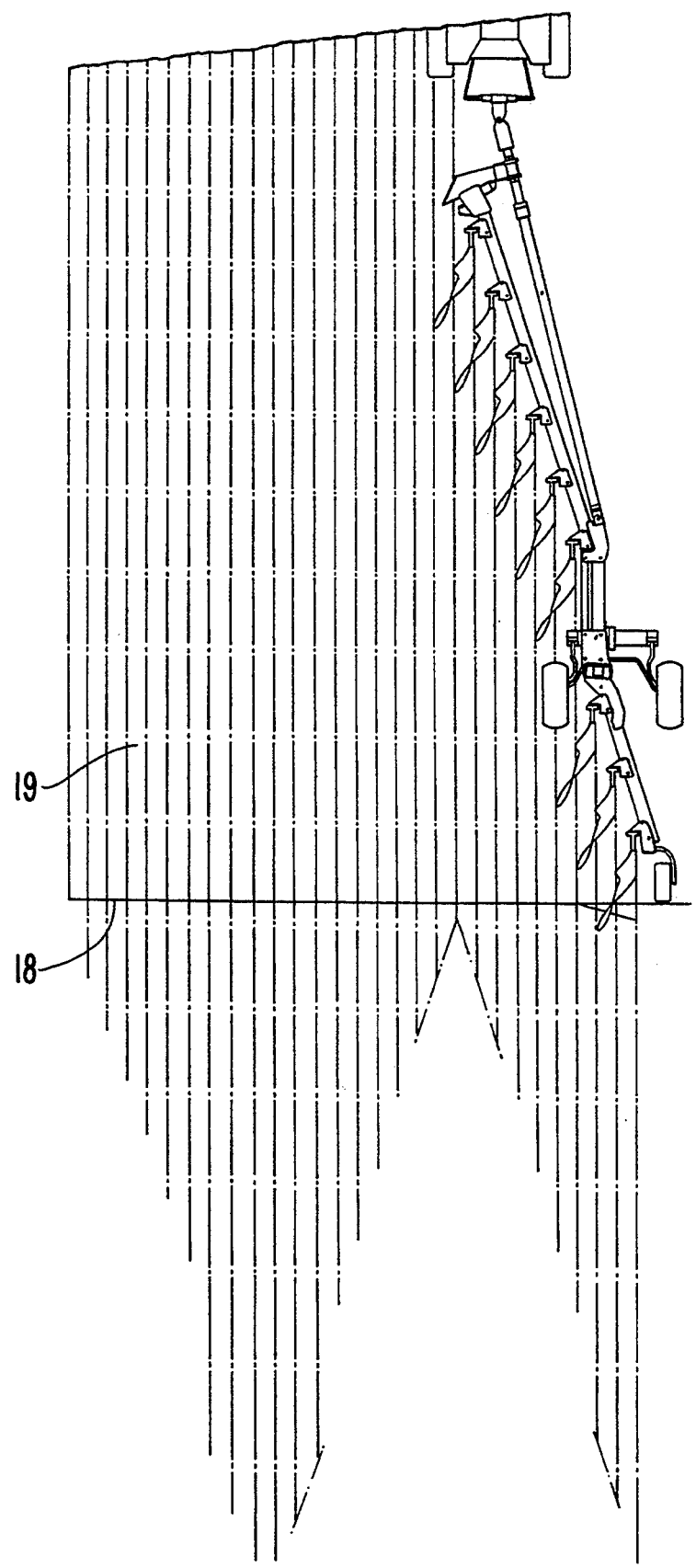
FIG. 1 is a diagrammatic top plan view illustrating the result of ploughing with a long prior art design of multi-share plough comprising an articulated plough frame, showing triangular areas not being ploughed as well as triangular areas being ploughed, giving rise to an unsatisfactory ploughing pattern, with an imaginary line indicating the end of the furrows.

These operations are also adapted to the speed of ploughing so that all plough bodies are run into the soil successively, i.e., at the imaginary line 18 extending laterally at the end of the furrows 19. The excellent result of such ploughing is illustrated in FIG. 4, as compared with ploughing results achieved with existing designs as illustrated in FIG. 1.

When the entire plough takes the ploughing position, the rear plough frame section 5 may, once more, tilt relatively freely within the permissible area, restricted by the pressure fluid operated actuator means 12.

The drag shaft 9, the intermediate wheels 4 and the depth wheel 6 determined the ploughing depth.

I claim:

1. A multi-share plough comprising:
    (a) a forward frame section adapted to be connected at a leading end to a rear of a towing vehicle;
    (b) a rear frame section pivotally connected at a forward end to a rear of the forward section;
    (c) a generally horizontal pivot which forms a pivotal connection between the forward and rear frame sections;
    (d) a plurality of plough bodies mounted on the rear frame section and the forward frame section;
    (e) a fluid pressure operated actuator coupled to the rear frame section, the actuator having a first mode to allow limited pivotal movement of the rear frame section and a second mode to prevent pivotal movement, including two cylinders positioned one above and one below the generally horizontal pivot; and
    (f) a pressure control valve coupled to the actuator and movable between a first position and a second position corresponding to the first mode and second mode of the actuator, including a spring-loaded pressure controlled manoeuvering valve device.

2. A plough according to claim 1, in which said manoeuvring valve device includes two oppositely directed check valves in fluid communication with said cylinders.

3. A plough according to claim 1, in which the rear frame section is connected indirectly to the forward frame section via a short intermediate frame section which forms a rearward prolongation of the forward frame section.

4. A plough according to claim 3, wherein the intermediate section is pivotally connected at its forward end to the rear of the forward frame section and at its rear end to the front of the rear frame section, each pivotal connection being an upright pivot which allows relative generally horizontal lateral pivotal movement to take place for each reversal of the plough body.

5. A plough according to claim 1, further comprising at least one supporting wheel at the rear of the forward frame section.

6. A gang plow comprising:
(a) a front plow-frame part;
(b) a rear plow-frame part connected at a front end thereof to a rear end of the front plow-frame part, said front and rear plow-frame parts defining a plow frame;
(c) a locking device movable between a first working position and a second working position, the locking device including:
(1) an actuating device actuated by pressure medium, the actuating device including two piston/cylinder units, and
(2) a control valve movable between the first and second working positions, the control valve having two oppositely directed non-return valves connected to the piston /cylinder units;
so that the first working position permits a restricted pivoting movement of the rear plow-frame part, and the second working position prevents the restricted pivoting movement; and
(d) a horizontal pivot pin about which the rear plow-frame part is pivotable.

7. A gang plow according to claim 6, wherein the control valve includes a spring-losded pressure-controlled valve element.

8. A gang plow according to claim 6, further comprising an intermediate frame which connects the rear plow-frame part to the front plow-frame part.

9. A gang plow according to claim 8, wherein a front end of the intermediate frame is connected, via a first vertical pivot pin, in an articulated manner to the rear end of the front plow-frame part, and a rear end of the intermediate frame is connected, via a second vertical pin, in an articulated manner to the front end of the rear plow-frame part, the first and second vertical pins permitting an essentially horizontal transverse movement of the rear plow-frame part relative to the front plow-frame part during a reversal of the plow.

10. A gang plow according to claim 6, further comprising a tractor vehicle which is connected to a front end of the front plow-frame part via a raisable and lowerable coupler;
at least one supporting wheel disposed at a rear end of the plow frame and which is raisable and lowerable by at least one of a piston/cylinder unit and a wheel for adjusting a furrow depth of the gang plow;
a first control valve disposed on the tractor for raising and lowering the coupler via a piston/cylinder unit; and
a second control valve, which is connected to the piston/cylinder unit and which is controlled by pressure medium, for raising and lowering the supporting wheel after raising and lowering of the coupler.

11. A gang plow according to claim 10, further comprising
a lockable pivot joint having a horizontal pivot axis and being disposed between the front plow-frame part and the rear plow-frame part;
a plurality of raisable and lowerable supporting wheels in the region of the pivot joint;
locking elements actuated by pressure medium and disposed between the front and the rear plow-frame parts and
a third control valve controlled by pressure medium for the locking elements, the locking elements operable to lock the pivot joint at least one of during raising and after an end of raising of the supporting wheels and to release the pivot joint after the supporting wheels have been lowered.

12. A gang plow according to claim 10, further comprising locking elements actuated by pressure medium for the piston/cylinder unit, the locking elements being disposed between the front and rear plow-frame parts;
A control valve controlled by pressure medium for the locking elements and the piston/cylinder unit, the control valve operable to lock the locking element after raising of the supporting wheel and after raising the wheel, and operable to release the locking elements at least one before and after the supporting wheel has been lowered.

13. A gang plow according to claim 10, wherein the second control valve is operable to raise and lower at least one of the supporting wheel and the wheel after a raising and a lowering of the coupler has ended.

* * * * *